United States Patent
Grove et al.

[15] 3,668,923
[45] June 13, 1972

[54] METER PROVING METHOD AND APPARATUS

[72] Inventors: Marvin H. Grove; Lyle R. Van Arsdale, both of Houston, Tex.

[73] Assignee: M & J Valve Company, Houston, Tex.

[22] Filed: June 19, 1970

[21] Appl. No.: 47,760

[52] U.S. Cl. ................................................................73/3
[51] Int. Cl. ......................................................G01f 25/00
[58] Field of Search ..................................73/3; 137/625.43

[56] References Cited

UNITED STATES PATENTS

| | | | |
|---|---|---|---|
| 3,387,632 | 6/1968 | Grove | 137/625.43 |
| 3,423,988 | 1/1969 | Grove et al. | 73/3 |
| 3,472,280 | 10/1969 | Van Scoy | 137/625.43 |
| 2,920,653 | 1/1960 | Wolff | 137/625.43 |

*Primary Examiner*—Louis R. Prince
*Assistant Examiner*—William A. Henry, II
*Attorney*—Flehr, Hohbach, Test, Albritton & Herbert

[57] ABSTRACT

Meter proving method and apparatus of the bidirectional type for calibrating liquid flow devices. It employs a four-way diverter valve of the gate type which is connected to the ends of the metering loop and which directs the flow in one direction or the other through the loop. The diverter valve is power operated and capable of rapid movement between operating positions. A leak detecting means is incorporated with the diverter valve and is used to indicate leakage past the sealing assemblies which would interfere with the accuracy of a metering run. Means including an electronic system serves to provide an automated cycle of operation.

10 Claims, 10 Drawing Figures

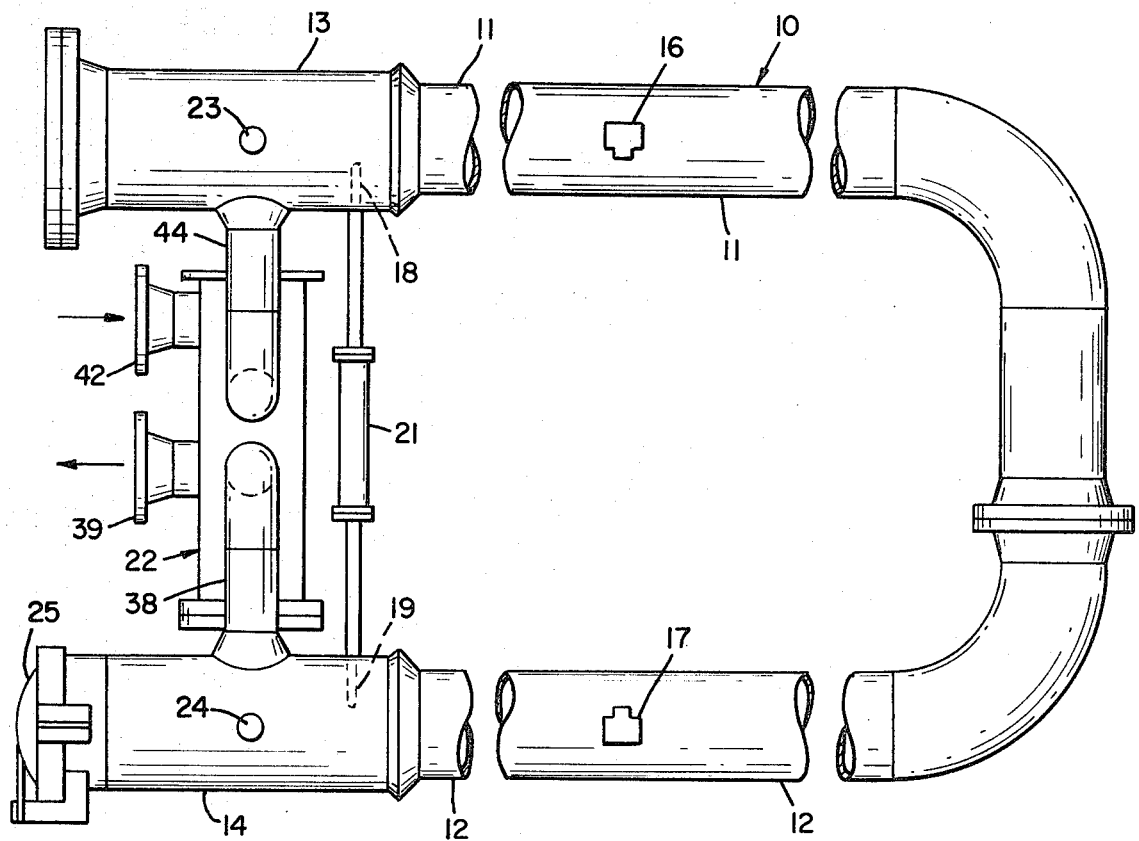
FIG_1
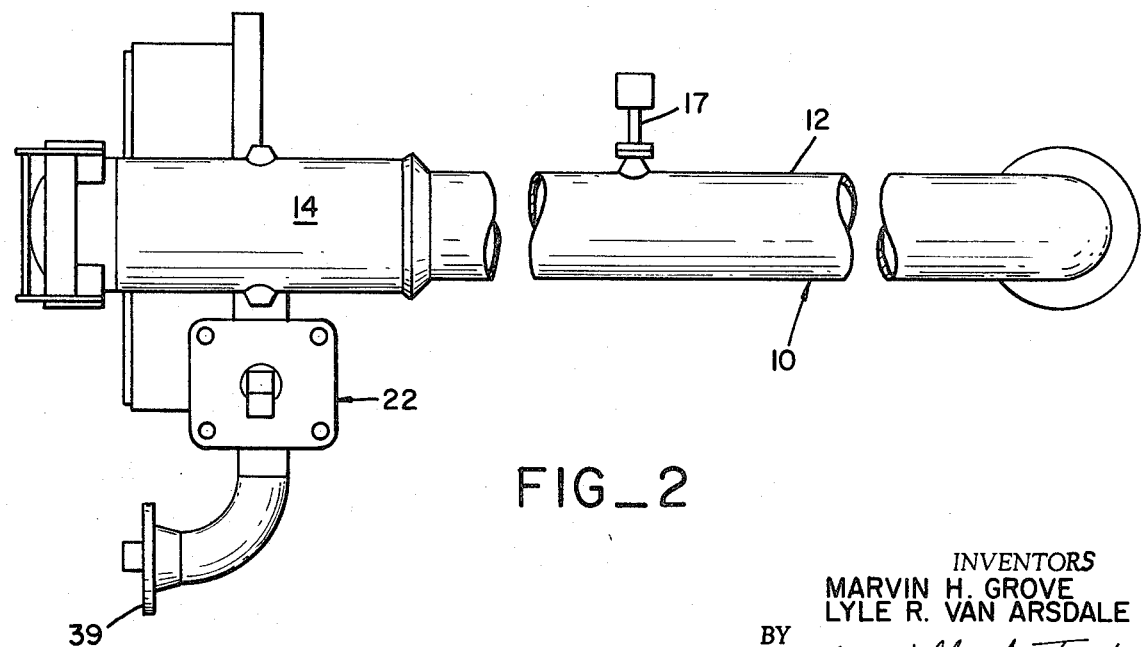
FIG_2

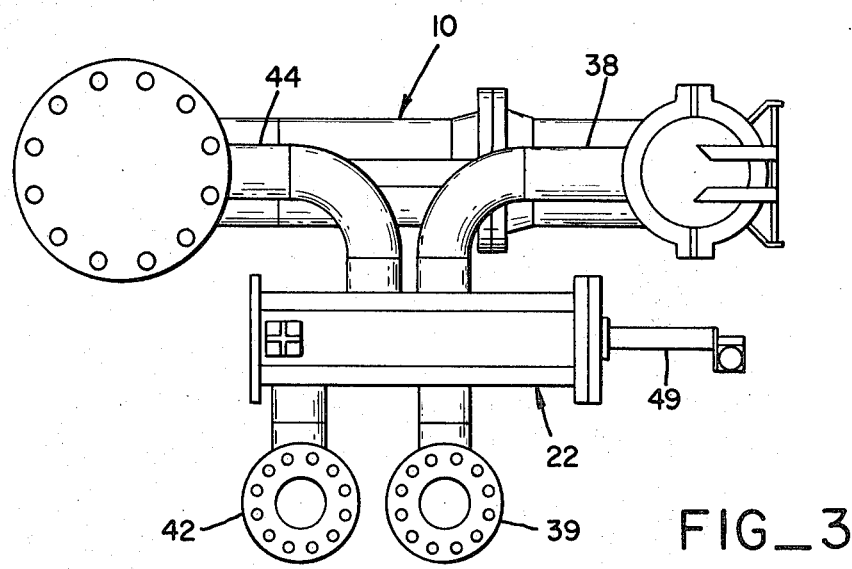
FIG_3
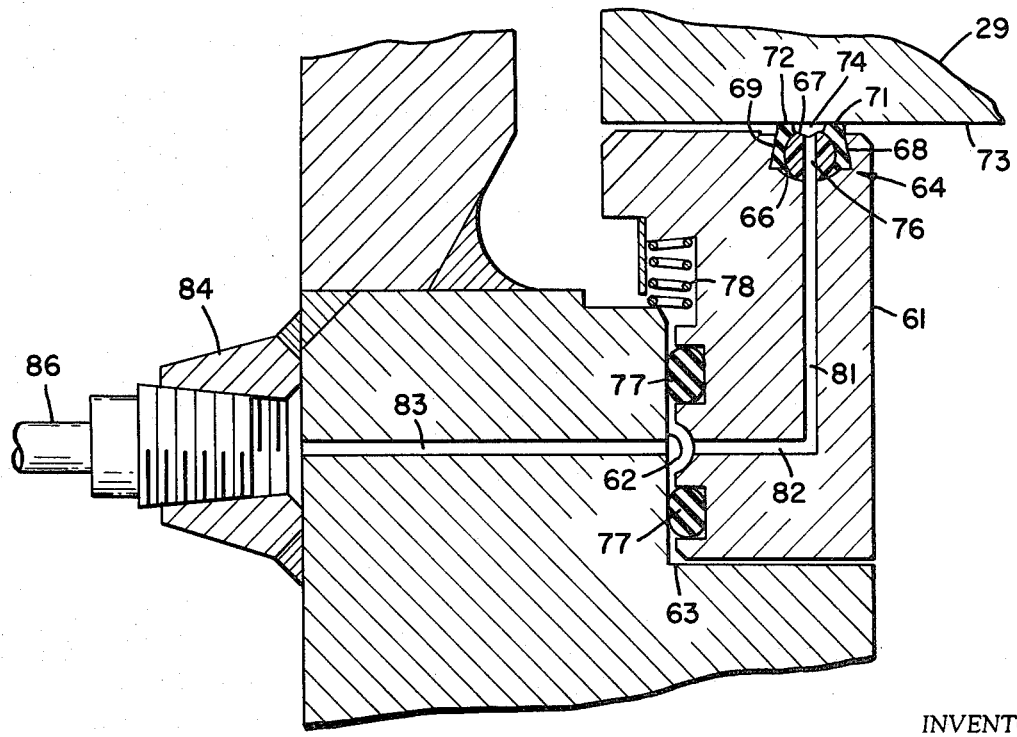
FIG_6

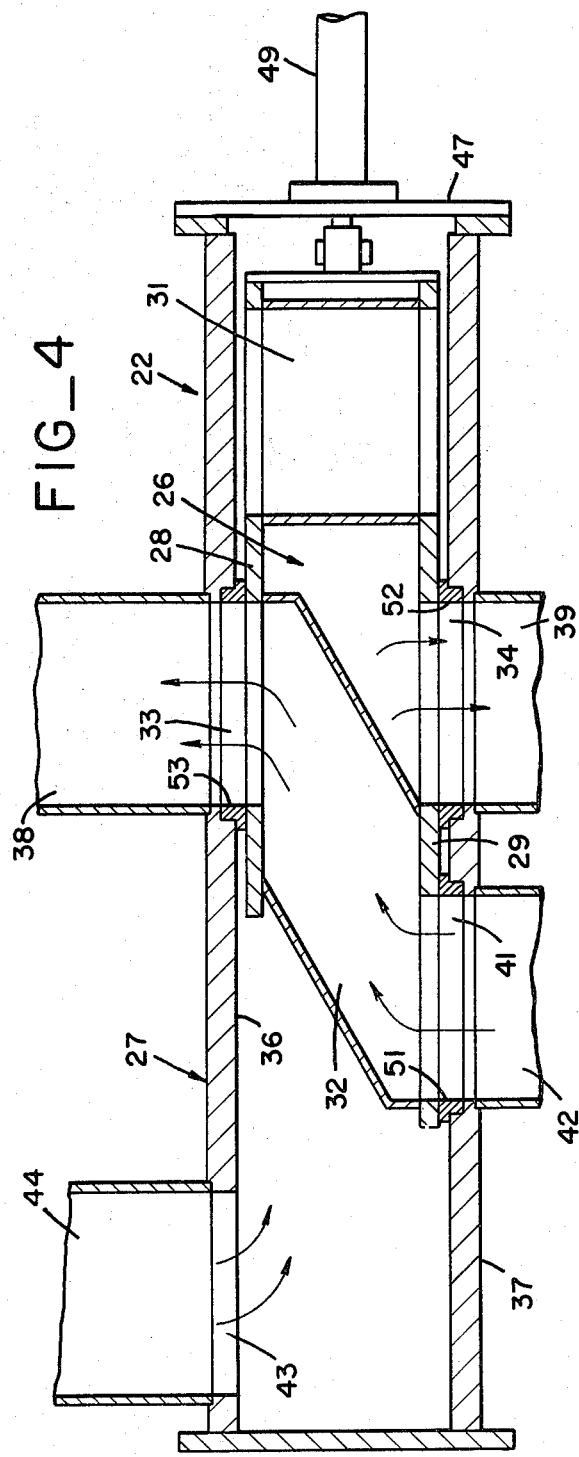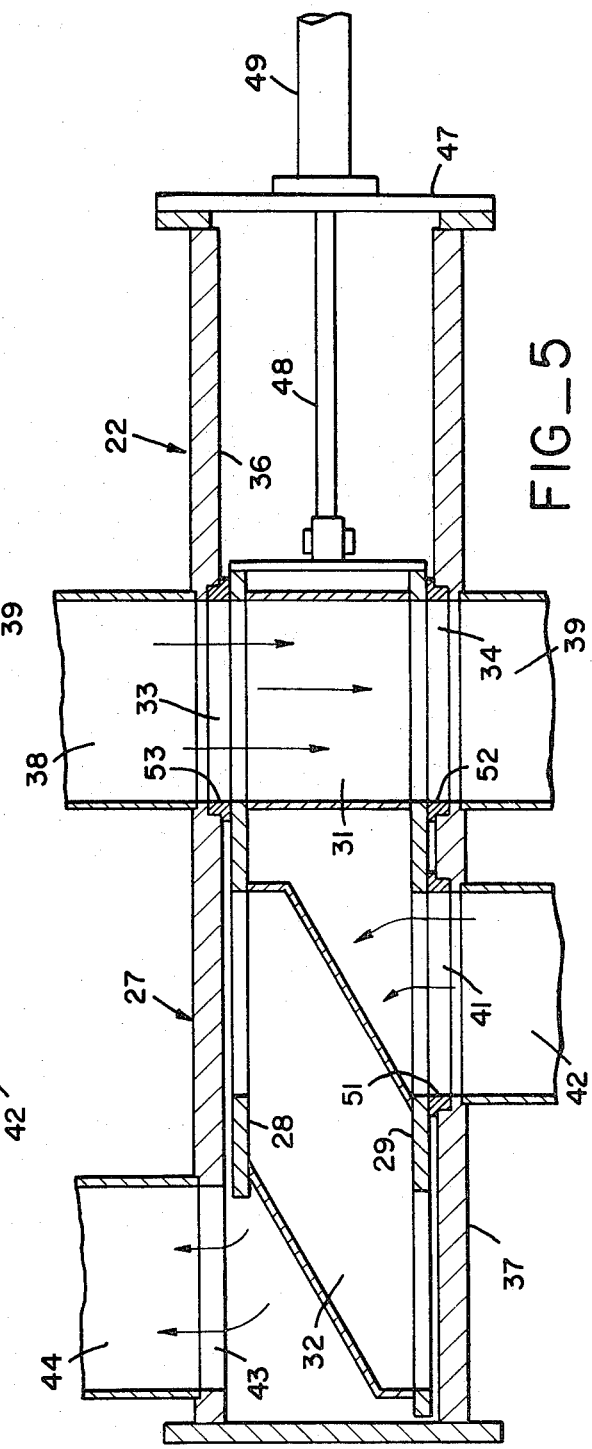

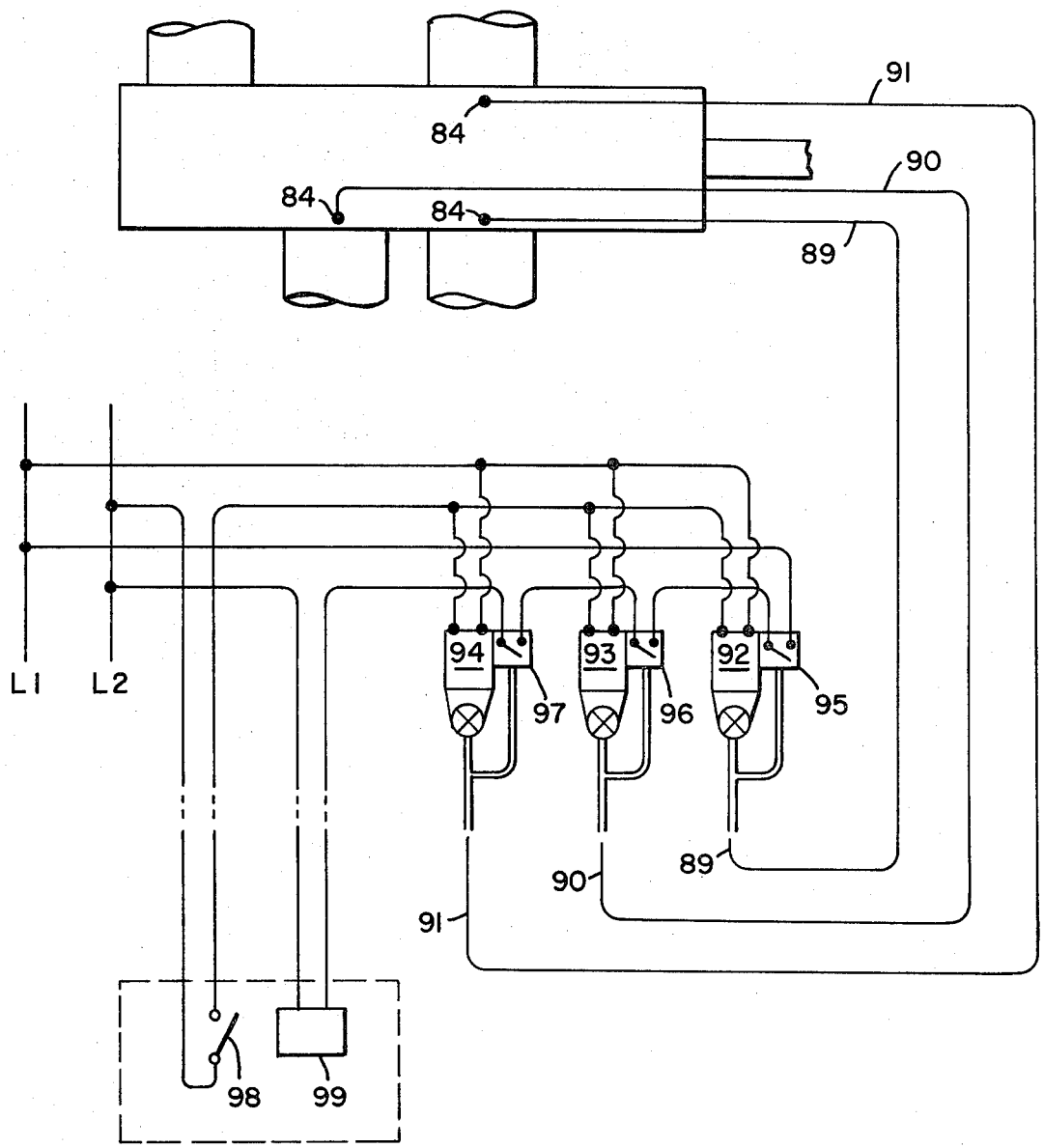
FIG_7

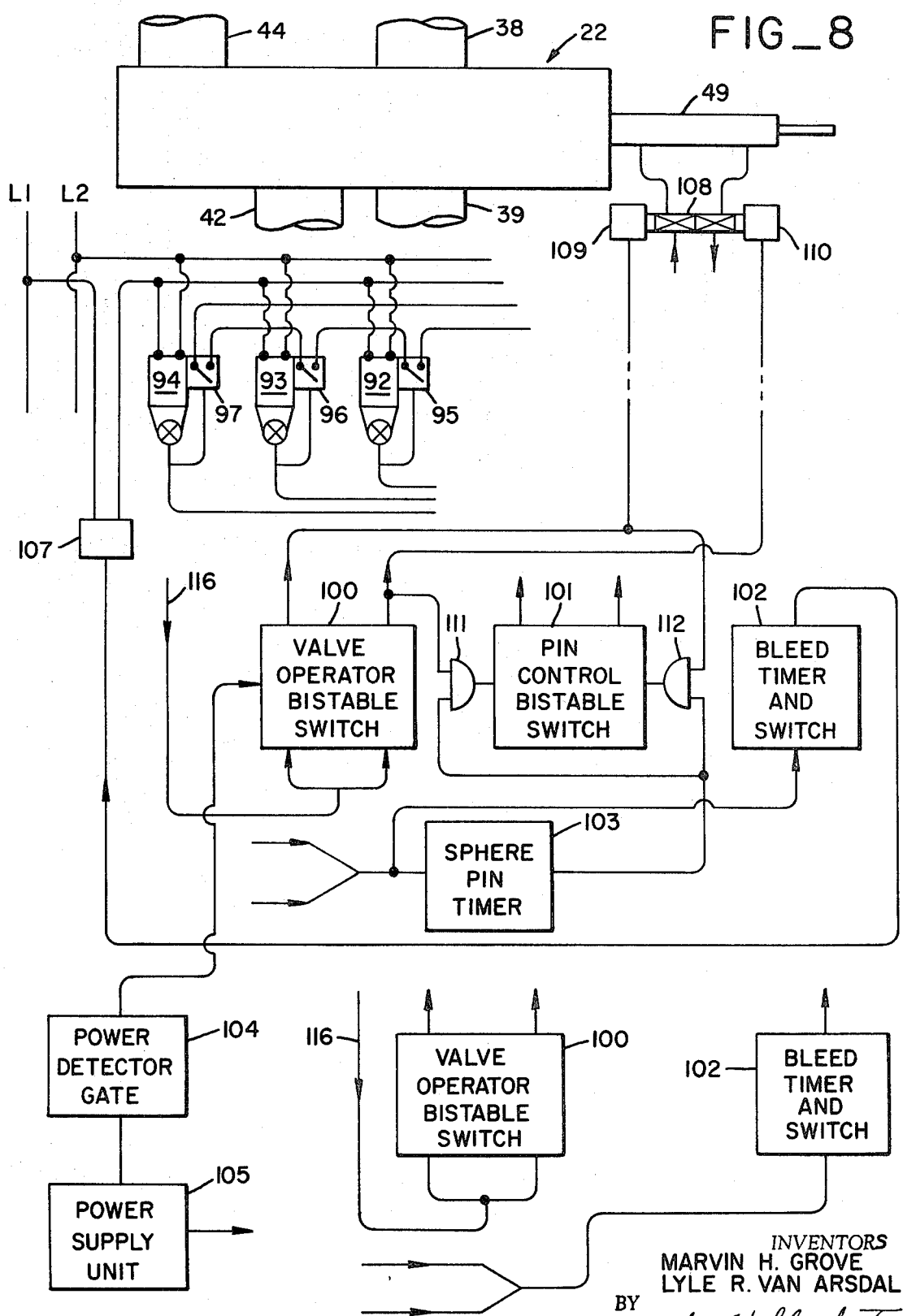

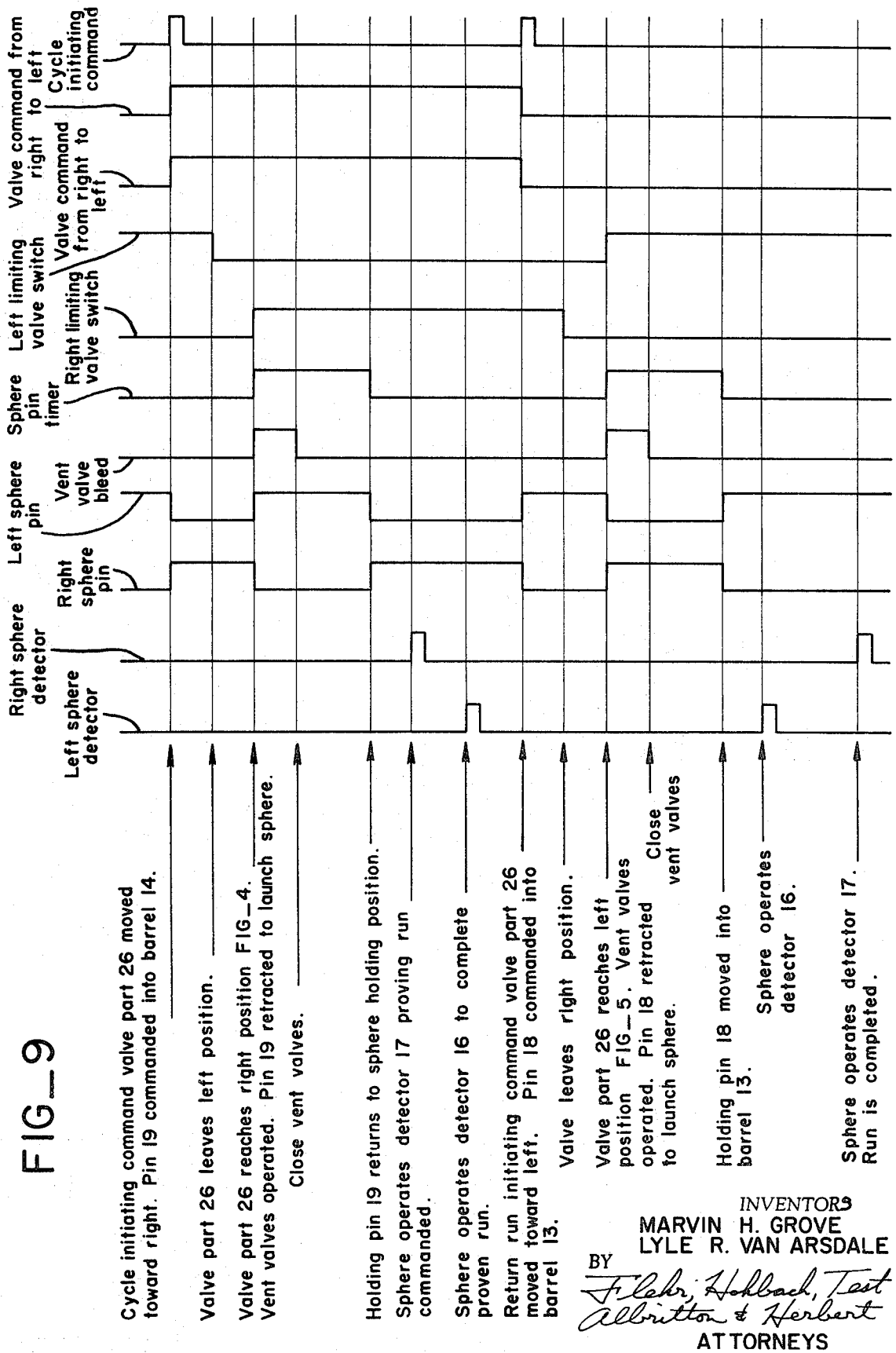

METER PROVING METHOD AND APPARATUS

BACKGROUND OF THE INVENTION

This invention relates generally to flow meter proving methods and apparatus of the bidirectional type, such as are employed in conjunction with pipe line transmission systems, part facilities for ship loading or unloading operations, or the like.

Conventional flow metering devices of the positive displacement or turbine types are known to be subject to serious inaccuracies that may be cumulated. Thus in connection with piping systems for conveying various liquid petroleum products, it is common to use so-called meter provers which make accurate periodic checks of the flow for calibration of the meter. Conventional meter provers employ an extended length of metering pipe of uniform internal diameter through which the main flow of the piping system is diverted. A sphere is launched into one end of the metering pipe and is propelled by flow through the pipe to the other end. In meter provers of the unidirectional type the sphere or plug is always launched into one end of the pipe, and is retrieved at the discharge end for relaunching into the pipe. Bidirectional meter provers such as are shown in U.S. Pat. 3,387,632 employ a so-called diverter valve by means of which flow from the main line is diverted in either direction through the metering pipe. Both types of meter provers employ detecting stations near the ends of the discharged ends of the metering pipe, together with an associated electrical system activated when the sphere passes through these detecting stations, whereby a flow meter reading is obtained for the time interval which is required for the travel of the sphere between the detecting points. The flow meter reading is then taken together with the predetermined volume of the metering pipe between the detecting points to provide accurate calibration data.

The present invention pertains particularly to meter prover methods and apparatus of the bidirectional type. The four-way diverter valves that have been used for such provers that have not been satisfactory, because of a number of reasons. Particularly the valves have been relatively expensive to manufacture due to their inherent design. Difficulty has been experienced with leakage which interferes with the desired accuracy. Any means employed to check such valves for leakage has required venting liquid from the body of the valves, which is objectionable compared to the method described herein, in that a substantial amount of liquid must be discharged to reduce the body pressure to atmospheric. Another disadvantage has been that such prior diverter valves have not been capable of simple power operation with rapid movement between operating positions. Another disadvantage of prior bidirectional meter provers is that sludge or other foreign solids present in the liquid passing through the diverter valve tends to accumulate in the body of the valve and interferes with proper operation and the desired accuracy.

SUMMARY OF THE INVENTION AND OBJECTS

An object of the present invention is to provide a meter prover method and apparatus of the bidirectional type which avoids the objectionable features of the prior meter provers of this type.

Another object of the invention is to provide a meter prover method and apparatus of the bidirectional type which incorporates a novel diverter valve of simple construction capable of being power operated at a rapid rate.

Another object of the invention is to provide a bidirectional prover method and apparatus employing a novel diverter valve having sealing assemblies in conjunction with leakage detection which will enable the operator to determine whether or not the valve is leaking before or during a run.

Another object is to provide a bidirectional meter prover method and apparatus which makes possible more direct flow of the liquid through the diverter valve for both valve operating positions.

Another object is to provide a bidirectional meter prover method apparatus having a novel overall cycle of operation and which can be automated by use of an associated electrical system.

Additional objects and features of the invention will appear from the following description in which the preferred embodiment has been set forth in detail in conjunction with the accompanying drawing.

BRIEF DESCRIPTION OF THE DRAWING

FIG. 1 is a plan view illustrating bidirectional meter proving apparatus in accordance with the present invention.

FIG. 2 is a side elevational view of the apparatus shown in FIG. 1.

FIG. 3 is an end view of the metering apparatus, looking toward the left hand end of FIG. 2.

FIG. 4 is a cross-sectional detail in section showing the diverter valve and its connection to the metering pipe, with the valve part in one operating position.

FIG. 5 is a cross-sectional detail like FIG. 4 but showing the valve part in its other operating position.

FIG. 6 is an enlarged detail in section showing one of the sealing assemblies and ducts for making connection to the exterior of the device.

FIG. 7 is a schematic view illustrating means connected with the sealing assemblies for detecting leakage.

FIG. 8 is a block diagram schematically illustrating an electrical system for automating the diverter valve.

FIG. 9 is a diagram illustrating a complete automated cycle for the apparatus, the cycle starting with the valve part in the position shown in FIG. 5.

FIG. 10 is a block diagram illustrating another embodiment of an electrical system for automating the diverter valve.

DESCRIPTION OF THE PREFERRED EMBODIMENT

The apparatus illustrated in FIGS. 1–3 of the drawing consists of a metering pipe 10 which generally is in the form of a loop having end portions 11 and 12 connected to enlarged head or barrel portions 13 and 14. The portions 11 and 12 are provided with the sphere detectors 16 and 17, and the barrel portions 13 and 14 are provided with the sphere retaining pins 18 and 19. These pins are retractable and may be operated by a hydraulic operating assembly 21. The four-way diverter valve 22, illustrated in detail in FIGS. 4 and 5, has connections with the barrel portions 13 and 14, and also has connections with the main line from which liquid is being diverted (see U.S. Pat. No. 3,423,988). Stationary pins 23 and 24 limit movement of the sphere within the barrels. Pin 24 may be removed to permit removal of a sphere through closure 25.

The diverter valve as illustrated in FIGS. 4 and 5 consists of an inner box-like valve part 26 which is movable between two operating positions and is disposed within the box-like housing 27. The valve part 26 consists of ported end plates 28 and 29 which are attached by welding to the ends of the metal ducts 31 and 32. The duct 31 is cylindrical and for the position of the valve part shown in FIG. 5 is in registry and alignment with the flow passages 33 and 34 in the end walls 36 and 37 of the body 27. These flow passages are in communication with the pipes 38 and 39, which connect respectively with the barrel and the pipe 39 which conducts liquid back to the main line. The duct 32 has its axis inclined as shown in FIGS. 4 and 5, and for the position of the valve parts shown in FIG. 4, one end of this duct communicates with flow passage 33 and pipe 38, and the other end with inlet flow passage 41 and the pipe 42. Pipe 42 connects with the downstream side of the metered flow line for introducing liquid into the meter prover. An arrangement of piping and valves for a complete system including the meter prover is shown in U.S. Pat. No. 3,423,988. For the position of the valve part 26 shown in FIG. 5 the inclined duct 32 is out of registry with all of the flow passages. However, the flow passage 41 in wall 37 and pipe 42 are in communication through the inner space of the body with the flow passage 43 with which the pipe 44 connects. Pipe 44 connects to the left-hand barrel 13 (FIG. 1). The valve body is of such dimensions that there is ample cross-sectional flow area about the duct 32 when the valve part is in the position shown in FIG. 5, so that flow may occur from pipe 41 to pipe 42 through the valve body space without flow restriction. The same is true of flow between pipe 44 and pipe 39 for the position shown in FIG. 4.

The box-like valve body 27 is closed at one end by plate 46 and at the other end by bonnet plate 47. An operating rod 48 is connected to one end of the valve part 26 and extends to a power operator such as the double acting cylinder piston assembly 49. Preferably this assembly is designed for rapid movement of the valve part 26 between its two operating positions.

The diverter valve is provided with three sealing assemblies 51, 52 and 53. Assembly 51 is carried by the body wall 37 and surrounds the flow passage 41. Assembly 52 is likewise carried by the body wall 37 and surrounds the flow passage 34. Assembly 53 is carried by the body wall 36 and surrounds the flow passage 33. Each of these annular assemblies provides a seal between the corresponding end wall of the body, and the adjacent end face of one of the plates 28 and 29 of the valve part. Preferably each sealing assembly provides a seal on two concentric sealing areas thereby providing a space between the sealing areas which is employed in conjunction with leak detecting means. A suitable sealing assembly of this type is shown in FIG. 6. It is also shown in copending application Ser. No. 17365 filed Mar. 9, 1970. It consists of a seat ring 61 made of metal and movably fitted within a cylindrical bore 62 which forms a part of the accommodating recess 63. That end of the seat ring 61 adjacent to plate 29 of the valve part is provided with a sealing assembly 64 accommodated within the recess 66. The assembly consists of an annular member 67 formed of a material-like nylon, together with more resilient members 68 and 69 which are interposed between the inner and outer peripheries of the nylon ring and the adjacent peripheral surfaces of the recess 66. The faces 71 and 72 formed by the members 68 and 69 recess against the adjacent surface 73 of plate 29 thus forming fluid tight seals on spaced concentric areas. The nylon ring 67 is provided with a groove 74 which communicates with the duct 76. The seat ring 61 is sealed with respect to the adjacent body part by the seal rings 77 of the resilient O-ring type. Circumferentially disposed compression springs 78 serve to urge the seat ring 61 and the sealing assembly against the plate 29.

The duct 76 in the sealing assembly communicates with the exterior of the body through ducts 81 and 82 in the seat ring 61 and duct 83 in the adjacent portion of the body. By means of fitting 84 on the exterior side of the body, pipe 86 may be in communication with the duct 83 and is employed for determining any leakage occurring past the sealing assemblies, immediately preceding and during a metering run. Briefly, if both faces 71 and 72 are effectively establishing seals with the surface 73 of the plate 73 for both sides of the valve part, then if pipe 86 is open to the atmosphere a small amount of liquid is drained from the space between the two sealing areas. Liquid enters this space during movement of the valve part between its operating positions. If leakage is occurring past a sealing assembly, then after venting the corresponding pipe 86 to the atmosphere, some pressure build-up will be noted after the pipe is closed. The leakage indication may be at the location meter prover valve 22, at a remote station or both remote and locally.

To facilitate detection of leakage at a remote station the arrangement shown in FIG. 7 can be employed. Here the fittings 84 for the three sealing assemblies are connected to pipe lines 89, 90, 91 which are controlled by the small electrically operated vent valves 92, 93 and 94. When the winding of one of these valves is energized it connects the associated line 89, 90 or 91 to the atmosphere for a limited period of time whereby pressure in the line is reduced to atmospheric. Thereafter the line is closed and any pressure rise can be noted by the pressure operated switches 95, 96 and 97 which are likewise connected to lines 89, 90 and 91. The energizing circuit for the windings of vent valves 92, 93 and 94 may lead to a remote station as indicated, where it is controlled by closing the switch 98. The contacts of the pressure operated switches 95, 96 and 97 are preferably connected in series with a circuit which includes the indicator 99, which may be a signal lamp. Thus at the beginning of a run the operator at the remote station temporarily closes the switch 98, whereby the vent valve 92, 93 and 94 are energized for a short period to open the lines 89, 90 and 91 to the atmosphere. Thereafter these lines are closed but are in communication with the pressure operated switches 95, 96 and 97. If there is a pressure build-up in all three sealing assemblies before the run is commenced, or if such a build-up occurs during a meter prover run, it is indicated by the device 99.

The indicating means described above is desirable in that it requires venting of only relatively small amounts of liquid from the spaces between the sealing areas. It indicates a leak only if all three sealing assemblies are leaking, since all assemblies must leak to cause significant leakage of liquid between the end portions of the prover pipe. Only relatively small amounts of liquid is vented from the spaces between the sealing areas, and therefore a leak builds up pressure rapidly and can be detected within a short period of time.

Operation of the meter prover described above is as follows: By means of piping and valves (not shown) connections are made to direct liquid flow into the pipe 42 of the gate valve 22, and out of the pipe 39. This flow also occurs through the flow meter (not shown) to be checked. Assuming that the valve part 26 is in the first of its two operating positions shown in FIG. 4, the flow occurs from pipe 42 through the duct 32, through pipe 38 and into the barrel 14. From barrel 14 the flow occurs through the prover pipe 10, into the barrel 13 and from thence through pipe 44, through the valve body 22, and out through the pipe 42. The sphere or plug to be propelled through the pipe 10 is at this time within the barrel 13, and both pins 18 and 19 may be in their projected or sphere engaging positions. When valve part 26 is moved by the hydraulic operator 49 to the operating position shown in FIG. 5 liquid from pipe 4 flows through the body about the duct 32, through pipe 44 and into the barrel 13. The sphere is also pressed against but held by the pin 18. A this time flow occurs about the sphere because of the larger diameter of the barrel 13, and such flow occurs through the prover pipe 10, into barrel 14, through pipe 38, duct 31, and out the pipe 39. Before starting a meter proving run it is desirable to determine whether or not any of the sealing assemblies of the gate valve 22 are leaking. Therefore the operator closes switch 98 illustrated in FIG. 7 for the purpose of venting the spaces between the sealing areas of each of the sealing assemblies. This venting is accomplished by energizing the solenoid vent valves 92, 93 and 94. After a short venting period the vent valves are closed and then the operator observes the indicator 99 to determine whether or not there is a leak. Because of all the contacts of the pressure switches 95, 96 and 97 are in series in the indicating circuit, a build-up of pressure must occur in the spaces between the sealing areas of each of the sealing assemblies, before a leak is indicated. In this connection it should be noted that a leak past one of the sealing assemblies will not cause any loss of accuracy in the meter prover. Before a leakage causes a loss of accuracy, all of the sealing assemblies must be leaking.

To commence a meter prover run the pins 18 and 19 are retracted by the hydraulic operator 21, and the sphere is thereby released and propelled into the prover pipe 11 and past the sphere detectors 16. This causes electric circuitry to start the readout or register of the flow meter whereby a meter reading is obtained for movement of the sphere between the two detectors 16 and 17. While the meter run is proceeding the operator may observe the indicator 99 to determine if there is any leaking of the sealing assemblies. After the sphere passes the detector 17 the operator has a readout for the movement of the sphere between the detector 16 and 17. The sphere now passes into the barrel 14 where it remains until the flow is reversed. The pins 18 and 19 are now projected into sphere engaging positions. To reverse the flow the valve 22 is power operated back to the position shown in FIG. 4. The sphere is now held against the pin 19. To start a return run the pin 19 is retracted by actuating the operator 21, whereby the sphere moves into the prover pipe 10 past the sphere detector 17 and 16 and returned to the barrel 13. Before commencing the return run the valve can again be checked for leakage by momentarily closing the switch 98 and thereafter observing the indicator 99.

The meter prover described above has a number of advantages over prior bidirectional provers. The valve 22 is relatively simple in its construction and operation, and can be power driven at a relatively rapid rate between its two operating positions. In both positions of the valve flow occurs directly through the valve body, thus obtaining a flushing out action without opportunity for collection or cumulation of solids. Also because of the director flow paths for liquid passing through the valve 22, resistance and pressure drop is reduced to a minimum. The power operator 49 may shift the valve to its different operating positions at a rapid rate, thus facilitating automation and reducing the overall time required for a proving cycle.

FIG. 8 schematically illustrates a system for automating the apparatus. The electronic portion of the system, represented schematically in block diagram form, includes the bistable switch 100 for issuing commands to the valve operator, the bistable switch 101 for issuing commands for operation of the sphere retaining pins 18 and 19, the timer 102 for effecting the bleeding of the sealing assemblies for a predetermined period, and the timer 103 for insuring operation of a sphere retaining pin for a predetermined period of time. In addition the system includes the power detector gate 104 and the power supply unit 105. The unit 105 supplies all of the circuitry of the system. A switch device 107 is inserted in the circuit for the vent solenoids 92, 93 and 94, and is operated by a command from the bleed timer 102. The hydraulic connections to the hydraulic operator 49 are connected to the four-way control valve 108, which also has connections as indicted for supplying and discharging hydraulic liquid. Devices 109 and 110 are shown for operating the four-way control valve between its two operating positions, and may be solenoids, pneumatic operators or the like, and these devices are caused to operate by demands from the bistable device 100. Bistable device 101 supplies commands for operating the sphere retention pins 18 and 19. Additional gates 111 and 112 are provided. Gate 111 is connected to receive commands from the bistable device 100 and the timer 103, and when properly conditioned it supplies a command to bistable device 101. Gate 112 receives commands from the valve operator bistable device 100 and also the timer 103, and applies a command to the bistable switch 101. The timer 103 receives commands from the two limiting switches associated with the hydraulic operator 49, these commands being represented by the two lines entering block 103.

Operation of the system shown in FIG. 8 is as follows: To initiate a cycle of operation a command is applied to the bistable switch 100 as by a manually operated switch line 16. This bistable switch generates a command to the device 109 to set the four-way valve 108 in a position to cause the operator 49 to move the inner valve part 26 to the right-hand position shown in FIG. 4. As the same time the holding pin 19 is commanded to its extend position shown in FIG. 1, whereby the sphere in barrel 14 is held against movement into the pipe 10. When the valve part 26 reaches the position shown in FIG. 4, the limiting switch associated with the operator 49 issues a command to timers 102 and 103 causing them to be set in operation. Timer 102 issues a command to switch means 107 for actuating the vent valves 92, 93 and 94. Within a short period thereafter, as determined by the setting of the timer 102, the vent valves are closed. At the same time that the valve part 26 reaches the position shown in FIG. 4 and the actuation of the bleed valves is initiated, a command is issued by the device 101 to cause the dual hydraulic operator 21 to retract the pin 19 in the barrel 14. This permits the sphere to be propelled by liquid flow into the adjacent end of the pipe 10. Shortly thereafter the vent valves 92, 93, and 94 are reclosed, as determined by the setting of the timer 102. The next operation in point of time is for the holding pin 19 to be repositioned in its sphere retaining position, as determined by the setting of timer 103. The next operation is that the sphere strikes the detector 17 and thus initiates a prover run. The sphere continues through the pipe 10 and eventually contacts and passes the detector 16. Eventually the sphere comes to rest within the barrel 13. The operator now applies a second proof initiating command to the bistable device 100, whereby the valve part 26 is moved from the position shown in FIG. 4 to that of FIG. 5. At the same time hold pin 18 is commanded to its extended position shown in FIG. 1 whereby the sphere in barrel 13 is held against movement into the pipe 10. When the valve part 26 reaches the position of FIG. 5 it causes the vent valves 92, 93 and 94 to be actuated to vent the sealing assemblies, and at the same time the left-hand holding pin 18 is actuated to retracted position to permit the sphere to move. Shortly after retraction of the pin 18, as determined by the setting of the timer 102, the vent valves 92, 93 and 04 are returned to closed position. The operator may again note any build-up or pressure in the sealing assemblies which would cause closing of the switches 95, 96 and 97, with resulting operation of the leak indicator. The holding pin 18 is now returned to its normal position and the sphere passes the detector 16 to start the meter run. The meter run is completed when the sphere passes the detector 17. The sphere returns to the barrel 14 from which it was started, at the conclusion of the overall cycle.

All of the foregoing steps are illustrated in FIG. 9. The left-hand part of this figure outlines the various steps in the complete cycle of operation, and the vertical jog lines forming the right-hand part of the figure, each represent the operation of a particular part as indicated.

A feature of the automated cycle described above is that bleeding of the sealing assemblies to determine leakage immediately before and during a meter run is carried out after the overall cycle has been commenced, and before the sphere has reached the first sphere detector. Thus the operator is apprised of a leak before the run is actually commenced, and likewise apprised of any leak during the course of the run. This is made possible because venting of the sealing assemblies involves venting only a relatively small amount of liquid from between the sealing areas, and in addition any relatively small amount of leakage past the sealing assemblies is immediately indicated because of the rapid pressure build-up.

Instead of using the retractable sphere retention pins 18 and 19 to launch a sphere into the end of the prover pipe, it is possible to dispense with these pins and rely upon accurate and rapid operation of the valve 22. With such a cycle of operation it is possible to greatly simplify the electronics, as shown by the block diagram of FIG. 10. Here the initiate command is likewise represented by line 116 and causes the bistable switch 100 to issue a command to energize the hydraulic operator 49 to move the valve part 26 to one or the other of its operating positions. Also the limiting switches on the valve 22 serve to apply commands to the bleed timer and switch 102, which in turn issues the command for operation of the bleed valves 92, 93 and 94. Where such a simplified system is employed the overall cycle of operation is as follows: A cycle initiating command as issued to the bistable switch 100, with the result that this switch issues a command to the hydraulic operator 49 to move the valve part 26 to the position shown in FIG. 4. At that time the sphere is within the barrel 14 and is in a position to be carried into the prover pipe when urged by liquid discharged into the barrel.

With respect to the operation of pins 18 and 19, they may be provided with separate operators. A convenient arrangement is to have each of the pin normally urged toward projected position. After being actuated to retracted position to release the sphere, the pin in such instance returns to projected position. Likewise the operator for each pin can be retracted for a sufficient time for the sphere to enter the barrel, after which the pin is again projected.

We claim:

1. A meter prover method of the bidirectional type making use of meter proving apparatus comprising a prover pipe through which a sphere or plug is propelled by liquid flow, a four-way valve having fluid connections with barrels at the ends of the pipe and also having upstream and downstream connections with a pipe system from which flow is diverted, the diverted flow being directed in one direction or the other through the prover pipe when the valve is moved from a first to a second operating position, the pipe having sphere detectors near its end portions, the valve having sealing assemblies with each assembly sealing on concentric areas surrounding an associated flow passage of the valve, the method comprising the steps of initiating a proving cycle by starting movement of a sphere from one barrel with the valve in a first operating position in which it directs flow into said one barrel through the prover pipe and out through the other barrel and valve, substantially simultaneously venting the spaces between the sealing areas of the sealing assemblies for a short interval of time and then discontinuing such venting, the liquid flow serving to move the sphere into the adjacent end portion of the prover pipe and to propel the same through the pipe whereby the sphere is caused to contact the sphere detectors, movement past the first contacted detector occurring at the end of a period that includes the interval of said venting and a subsequent interval, indicating any rise in pressure in the spaces between the sealing areas of the sealing assemblies during said subsequent interval and before the sphere reaches the first detector, and causing the sphere to come to rest in the other barrel after being discharged from the prover pipe.

2. A method as in claim 1 in which the sphere is released from a position in which it is held within the one barrel at the time the spaces between the sealing areas of the sealing assemblies are vented to atmosphere.

3. A method as in claim 1 in which, after the steps recited in claim 1, the valve is moved to its second operating position to reverse the direction of liquid flow through the prover pipe, the sphere is caused to be propelled by liquid flow into the adjacent end portion of the prover pipe, the spaces between the sealing areas of the sealing assemblies are simultaneously vented to atmosphere for a period of time after which such venting is terminated, indicating any rise in pressure in the spaces between said sealing areas before the sphere reaches the first sphere detector and also during the time the sphere is being propelled through the prover pipe between the two detectors, and then causing the sphere to come to rest in said one barrel.

4. A method as in claim 3 in which the sphere is held in a position from which it is released until the spaces between the sealing areas are vented to atmosphere, such holding of the sphere occurring in both said one barrel at the commencement of a complete proving cycle, and in the other barrel in the final reverse portion of the cycle.

5. A meter prover system comprising a prover pipe having barrels of enlarged diameter connected to its two ends, a diverter valve comprising a box-like valve body having opposed end walls provided with flow passages, a first flow passage in one end wall being connected with one barrel, a second flow passage in the same end wall connected with the other barrel, a third flow passage in the other end wall adapted to be connected to a downstream portion of a piping system, a fourth flow passage in the other end wall forming an inlet adapted to be connected to an upstream portion of the piping system, the first and second flow passages being spaced apart and the third flow passage being in alignment with the first flow passage, a valve part disclosed within the body and movable in opposite directions between two operating positions, said valve part including separate first and second ducts having their ends terminating adjacent the end walls, the first one of said ducts being disposed whereby when the valve part is in said first operating position the first duct is in registration with the first flow passage of said one end wall and the third outlet passage is in the other end wall, the second duct being so positioned and proportioned whereby when the valve part is in said first operating position it is out of registration with all of the flow passages and permits flow of liquid from the fourth inlet flow passage about the second duct and out of the valve body through the second flow passage in the one end wall, said ducts being likewise positioned and proportioned whereby for the second operating position of the valve part the ends of the second duct are brought into registration with the first flow passage of the one end wall and the fourth inlet flow passage of the other end wall, and the second duct is out of registration with all of the flow passages, and sealing means surrounding the first flow passage, the third outlet flow passage, and the fourth inlet flow passage, said sealing means serving to establish fluid tight seals between the end walls of the body and the ends of the cooperating ducts for the two operating positions of the valves, said valve serving to direct flow in opposite directions through the meter prover pipe for its two operating positions.

6. Apparatus as in claim 5 together with means for detecting leakage of liquid past all of the sealing means.

7. Apparatus as in claim 5 in which each of said sealing means consists of a sealing assembly adapted to establish seals on two concentric annular areas, together with duct means for venting the space between said concentric sealing areas to the atmosphere.

8. Apparatus as in claim 5 in which the first duct means is disposed on an axis perpendicular to said end walls of the valve body and in which said second duct means has its axis inclined to the first and second end walls.

9. A meter prover comprising the diverter valve defined in claim 5 together with a prover pipe having barrels of enlarged internal diameter connected to the ends of the pipe and pipes connecting said first and second flow passages with said barrels.

10. A four-way diverter valve for bidirectional meter provers comprising a box-like valve body having opposed end walls provided with flow passages, a first flow passage in one end wall being adapted to be connected with one end portion of a meter prover pipe and the second flow passage in the same end wall being adapted to be connected to the other end of the meter prover pipe, a third flow passage in the other end wall providing an outlet flow passage adapted to be connected to the downstream end of an associated piping system, a fourth flow passage in the last named end wall forming an inlet passage adapted to be connected to the upstream side of the associated piping system, the first and second flow passages in said one end wall being spaced apart, the third outlet flow passage in said other end wall being in axial alignment with the first flow passage, the fourth inlet passage in the said other end wall being out of alignment with both the first and second flow passages in said one end wall, a movable valve part disposed within the valve body between said end walls and movable parallel to the end walls between two operating positions, said valve part including separate first and second fluid ducts having their ends terminating adjacent the end walls, the first one of said ducts being disposed whereby when the valve part is in said first operating position the duct is in alignment with and in registration with the first flow passage of said one end wall and the third outlet passage in the other end wall, the second duct being so positioned and proportioned whereby when said valve part is in said first operating position it is out of registration with all of said passages and permits flow of liquid from the fourth inlet flow passage, about the second duct, and out of the valve body through the second flow passage in the one end wall, said ducts being likewise positioned and proportioned whereby for the second operating position of the valve part the ends of the second duct are brought into registration with the first flow passage of the one end wall and the fourth inlet flow passage of the other end wall, and the second duct is out of registration with all of the flow passages, and sealing means surrounding the first flow passage, the third outlet flow passage, and the fourth inlet flow passage, said sealing means serving to establish fluid tight seals between the end walls of the body and the ends of the cooperating ducts for the two operating positions of the valve.

* * * * *